United States Patent
Eschbach et al.

(10) Patent No.: US 6,795,211 B1
(45) Date of Patent: Sep. 21, 2004

(54) RESOLUTION ENHANCEMENT OF COMPRESSED IMAGE DATA

(75) Inventors: Reiner Eschbach, Webster, NY (US); Ricardo L. de Queiroz, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/433,228

(22) Filed: Nov. 4, 1999

(51) Int. Cl.[7] .......................... G06K 15/02; H04N 1/409
(52) U.S. Cl. ....................................... 358/1.2; 358/3.27
(58) Field of Search ........................ 358/1.2, 1.9, 3.27, 358/451, 426.04, 426.02; 382/299, 300, 266, 269, 235

(56) References Cited

U.S. PATENT DOCUMENTS

| | | | |
|---|---|---|---|
| 4,628,534 A | * 12/1986 | Marshall | 382/299 |
| 4,757,552 A | * 7/1988 | Asano et al. | 382/267 |
| 4,847,607 A | * 7/1989 | Schoon | 345/469.1 |
| 4,885,786 A | * 12/1989 | Anderson et al. | 382/235 |
| 5,282,057 A | 1/1994 | Mailloux et al. | 358/445 |
| 5,293,254 A | 3/1994 | Eschbach | 358/445 |
| 5,293,432 A | * 3/1994 | Gonser et al. | 382/299 |
| 5,387,985 A | 2/1995 | Loce et al. | 358/447 |
| 5,444,552 A | * 8/1995 | Smith, III | 358/465 |
| 5,555,557 A | 9/1996 | Mailloux | 382/299 |
| 5,579,445 A | 11/1996 | Loce et al. | |
| 5,696,845 A | 12/1997 | Loce et al. | 382/254 |
| 5,724,455 A | 3/1998 | Eschbach | 382/260 |

* cited by examiner

*Primary Examiner*—Scott Rogers
(74) *Attorney, Agent, or Firm*—Fay, Sharpe, Fagan, Minnich & McKee, LLP (57) ABSTRACT

A system is disclosed for enhancing resolution of compressed image data. All operations in the present invention are performed in the CCITT compressed domain. For the purpose of the present invention, the input image data is compressed which is mapped to the transitions of the input line. A line is interpolated between the input lines and the transitions of the interpolated line are determined according to the positional difference of transitions in input lines. The transitions of each line in resolution enhanced data are encoded into a compressed codes.

29 Claims, 11 Drawing Sheets

RESOLUTION ENHANCEMENT OF COMPRESSED IMAGE DATA

TECHNICAL FEILD

The present invention relates generally to resolution enhancement technology (RET) and more particularly to methods and systems for enhancing resolution of compressed image data.

BACKGROUND OF THE INVENTION

Resolution Enhancement Technology (RET) is a well-established technology for the improvement of printed text. Resolution enhancement of input image data involves pattern-matching techniques to smooth text edges and avoid jaggedness. A large number of methods exist. In general, with RET techniques the edges of letters are recorded and diagonal edges are smoothed. A number of these RET techniques are summarized below.

U.S. Pat. No. 5,282,057 to Mailloux, et al. discloses a bit-map image resolution converter for converting binary image data originally generated at a lower resolution into representative binary image data of a higher resolution, wherein the conversion ratio, or magnification factor, is an integer value. This patent also discloses methods for smoothing the interpolated output image to thereby reduce objectionable visual characteristic that are observable in digitally encoded data using conventional magnification techniques.

U.S. Pat. No. 5,387,985 to Loce, et al. teaches a non-integer image resolution conversion using statistically generated look-up tables for converting the resolution of bitmap images, and using a template matching process to alter the resolution of digital images for printing or similar methods of rendition. Statistically generated templates, implemented using look-up tables, are used to improve document appearance by converting from an original input spatial resolution to an output spatial resolution that is device dependent, where there is a non-integer relationship between the input and output resolutions. The resulting image signals may then be utilized to control a scanning beam where the beam varies in intensity and duration according to the pulses used to control it.

U.S. Pat. No. 5,579,445 to Loce, et al. discloses a method and apparatus for automating the design of morphological or template-based filters for print quality enhancement. A plurality of different phase, but same resolution, subsampled images are generated from training documents. Statistical data derived therefrom is then employed in an automated process to generate filters. The filters may be used for resolution enhancement and/or conversion of bitmap images. Furthermore, the statistical data is used to produce filters that are intended to not only optimize image structure, but image density as well.

U.S. Pat. No. 5,696,845 to Loce, et al. teaches a method and apparatus for improving the appearance of printed documents, and more specifically, using a template matching process to enhance the fast-scan resolution of digital images while maintaining raster resolution for printing. Multiple-bit per pixel, statistically generated templates, implemented using look-up tables, are used to improve document appearance by converting from a single-bit per pixel to N-bits per pixel, while preserving raster resolution of the printed output. The resulting N-bit per pixel image signals may be utilized to control a scanning beam where the beam varies in intensity and duration according to the pulses used to control it.

U.S. Pat. No. 5,724,455 to Eschbach discloses an automated template design method for print enhancement for automating the design of pattern matching templates used to implement a print quality enhancement filter. More particularly, the method is directed to the use of a representative set of page description language decomposed training documents, and statistical data derived therefrom, in an automated process which generates templates for resolution enhancement and/or conversion of bitmap images.

Figure 1:
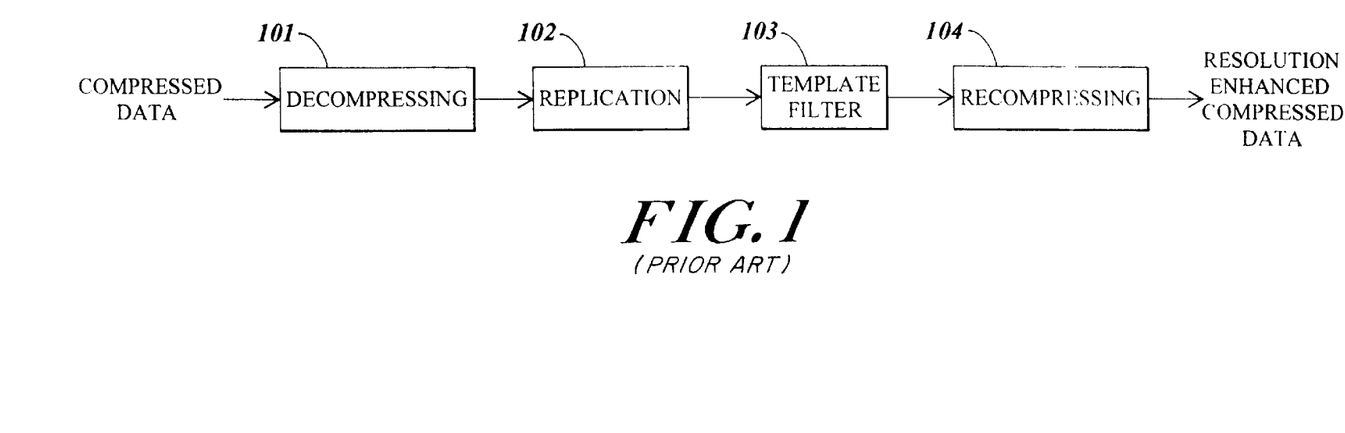
FIG. 1 is a simple block diagram of a resolution enhancement device using template matching filter in compressed domain.

The above described RET techniques use template-matching filters and are applied basically to bitmap pixel data not to compressed data. In resolution enhancement of input image data, the pixels are not only magnified by replication in each direction but a template filter is also applied to smooth edges and correct jaggedness. FIG. I is a simple block diagram in which the replication and template matching filtering are applied to the compressed data. If the image containing text is compressed with CCITT compression schemes, the enhancement involves the steps of decompressing the input image data, replicating the compressed data, applying template-matching filter to the replicated data, and recompressing the resolution enhanced pixel data.

As shown in FIG. 1, the compressed data is input and decompressed in the decompressing unit 101. The decompressed data is applied to the replication unit 102 and the number of pixels is magnified in replication unit 102 to enhance the resolution of the input image. The replicated pixel data is sent to the template matching filter 103 and the edge of replicated pixel data is smoothed in the template matching filter 103. The replicated and smoothed pixel data is compressed again in recompressing unit 104. From this figure, a decompressing unit 301 and a recompressing unit 304 are needed to apply the template-matching filter to compressed data.

Figure 2A:
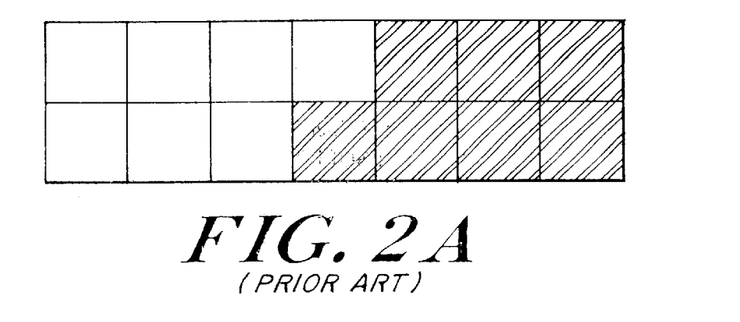
FIGS. 2A–2I are bitmap examples of each output in FIG. 1.
Figure 2B:
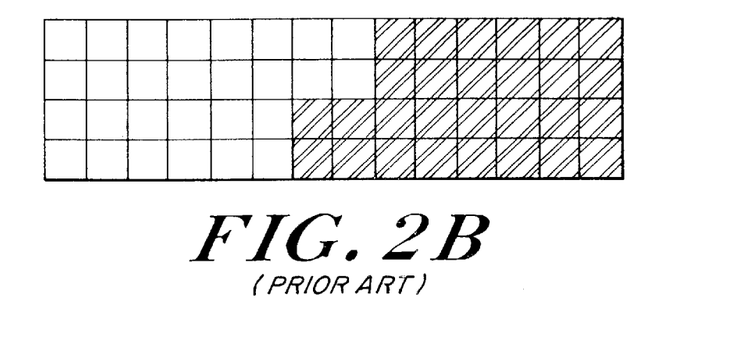
Figure 2C:
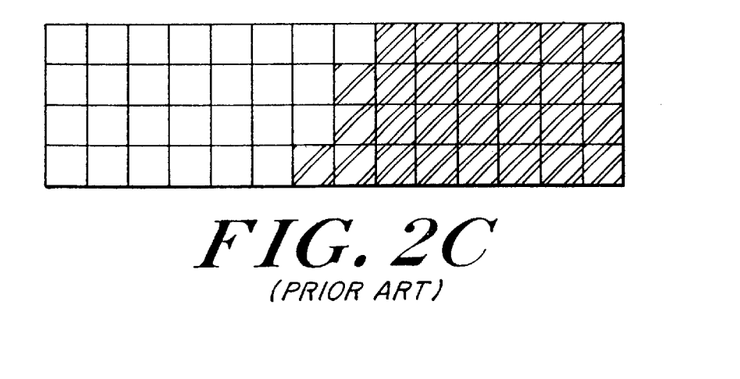
Figure 2D:
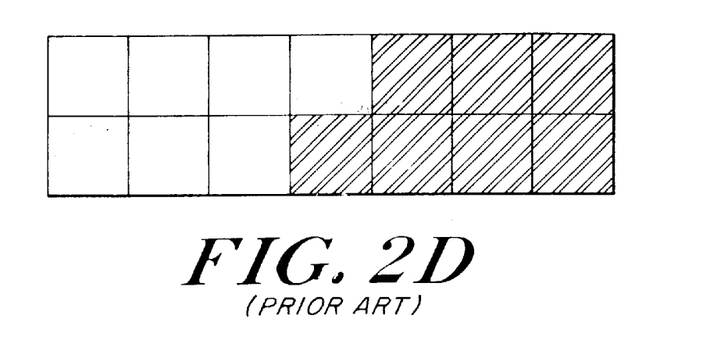
Figure 2E:
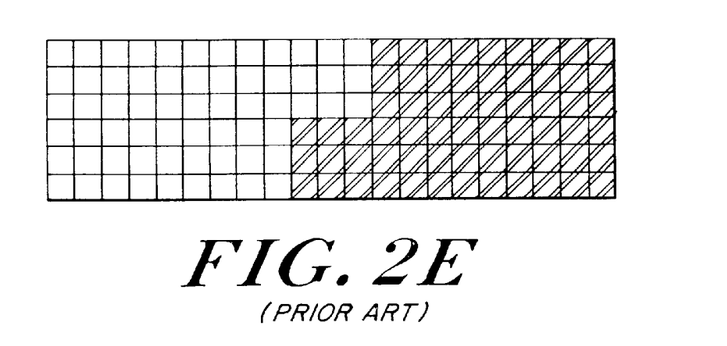
Figure 2F:
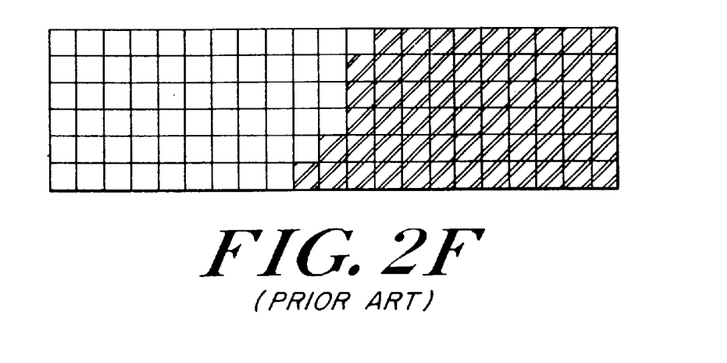
Figure 2G:
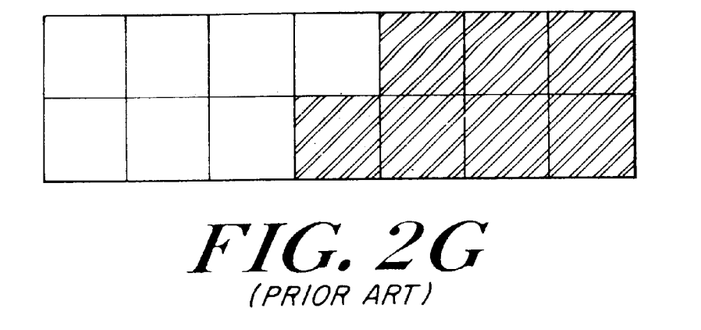
Figure 2H:
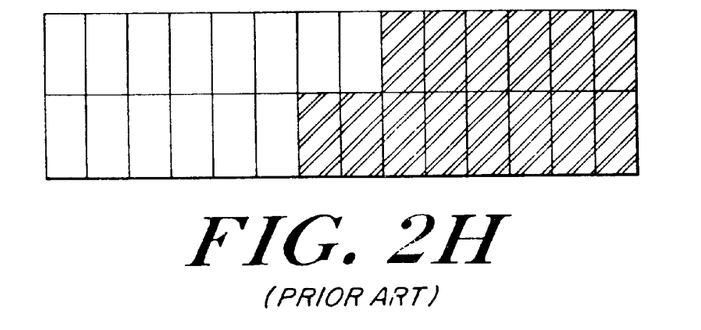
Figure 2I:
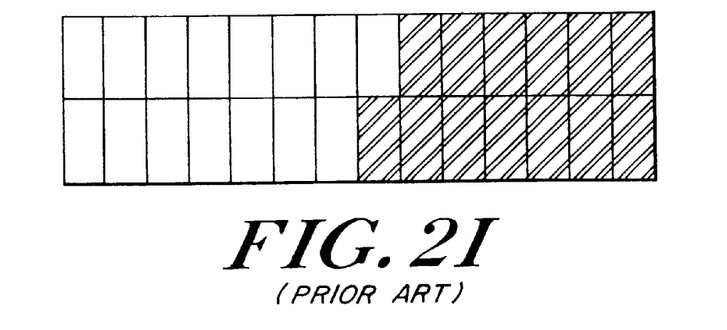

FIGS. 2A–2I depict the bitmap examples of each output in FIG. 1 and each group of FIGS. 2A–2C, 2D–2F and 2G–2I illustrates an example of up-scaling as 2×2, 3×3 and 2×1, respectively. FIG. 2A is the output of decompressing unit 101, which is decompressed bitmap pixel data. FIG. 2B is the output of replication unit 102 in which the bitmap of decompressed pixel data in FIG. 2A is replicated by 2×2. FIG. 2C is the output of template matching filter 103 in which the bitmap of pixel data up-scaled by 2×2 in FIG. 2B is edge smoothed. FIG. 2D is the output of decompressing unit 101, which is decompressed bitmap pixel data. FIG. 2E is the output of replication unit 102 in which the bitmap of decompressed pixel data in FIG. 2D is replicated by 3×3. FIG. 2F is the output of template matching filter 103 in which the bitmap of pixel data up-scaled by 3×3 in FIG. 2E is edge smoothed. FIG. 2G is the output of decompressing unit 101, which is decompressed bitmap pixel data. FIG. 2H is the output of replication unit 102 in which the bitmap of decompressed pixel data in FIG. 2G is replicated by 2×1. FIG. 2I is the output of template matching filter 103 in which the bitmap of pixel data up-scaled by 2×1 in FIG. 2H is edge smoothed.

In order to obtain the resolution enhanced pixel data, the device in FIG. 1 needs amount of buffering and processing steps, which may cost up and be inappropriate in low-end level application.

SUMMARY OF THE INVENTION

The present invention provides methods and systems for increasing the resolution of image data. With the present invention all resolution enhancing technology (RET) operations may be performed in the compressed domain, so that the resolution enhancement is applied to the transition maps and not to pixel image data. The present invention provides a simple manipulation of the compressed image data, which effectively increases the image of resolution and smooth edges in the image, while avoiding full decompression and recompression of the data. This results in significant savings in time and computational overhead.

In accordance with one aspect of the present invention, a method is practiced in a compressed domain to enhance a resolution of input image data. For the purpose of the present invention, (a) the transitions of the input lines of the compressed image data are analyzed. (b) The positional differences between the closest compatible transitions in the input lines are calculated. (c) Distances of transitions from a reference position in each input line are magnified. (d) A line is interpolated between the input lines and the transitions of the interpolated line are determined according to the positional differences. (e) The corrected transitions of each line are encoded to compressed codes.

In accordance with another aspect of the present invention, a method is practiced in a compressed domain to enhance a resolution of input image data. For the purpose of the present invention, (a) the transitions of the input lines of the compressed image data are analyzed. (b) Distances of transitions from a reference position in each input line are magnified. (c) The positional differences between closest compatible transitions in the magnified transitions of input lines are calculated. (d) The positional differences are compared with a limit number. (e) A line is interpolated between the input lines and transitions of the interpolated line are determined according to the positional differences and the limit number. (f) The corrected transitions of each line are encoded to compressed codes.

In accordance with another aspect of the present invention, an apparatus operates with data in a compressed domain to enhance a resolution of input image data. For the purpose of the present invention, a decoder maps the compressed image data to the transitions of the input line. A processor magnifies the distances of transitions from a reference position in each input line. The processor also interpolates a line between the input lines. The transitions of the interpolated line are determined according to the transitions of input line. An encoder encodes the corrected transitions of each line into compressed codes.

In accordance with another aspect of the present invention, a computer program for controlling a computer to enhance a resolution of compressed image data is stored in a recording medium readable by the computer. A means is recorded on the recording medium for analyzing transitions of compressed image data in input lines. A means is recorded on the recording medium for calculating positional differences between the closest compatible transitions of input lines. A means is recorded on the recording medium for magnifying distances of transitions from a reference position in each input line. A means is recorded on the recording medium for interpolating a line between the input lines where transitions of the interpolated line are determined according to the positional differences. A means is recorded on the recording means for encoding the corrected transitions to compressed codes.

In accordance with another aspect of the present invention, the present invention is applied to a facsimile machine for enhancing a resolution of compressed image data. The facsimile machine includes: an analyzer for analyzing transitions of compressed image data in input lines; a calculator for calculating positional differences between the closest compatible transitions of input lines; a magnifier for magnifying distances of transitions from a reference position in each input line; an interpolator for interpolating a line between the input lines, where transitions of the interpolated line is determined according to the positional differences; and an encoder for encoding the corrected transitions to compressed codes.

The present invention provides a system where a simple RET operation is performed to increase the resolution by an integer factor in each direction. Performing RET in the compressed domain gives potential speed and memory improvements over spatial domain processing. The effects of the invention is to replicate pixels horizontally and duplicate lines by interpolation. The number of the transitions in present invention is commonly much smaller than the number of pixels in a row. The process provided in the present invention achieves savings in memory and computation by not computing pattern-matching filter.

The RET performed in the compressed domain can be achieved at potentially lower processing and memory requirement. It is not necessary to apply template matching to every pixel in the image, thus saving operation and reducing complexity. It is also avoid the process of converting the transitions to rasters and the more expensive process to convert from rasters to transitions (run length or offset counting).

BREIF DESCRIPTION OF THE DRAWINGS

An illustrative embodiment of the present invention will be described below relative to the following drawings.

DETAILED DESCRIPTION OF THE INVENTION

The illustrative embodiment of the present invention concerns a resolution enhancing technology (RET) technique that operates on compressed image data and is applicable to up-scaling as 2×2, 3×3 and 2×1, etc. In the illustrative embodiment, input image data is received in a compressed format. The compressed image data identifies transitions (i.e. when pixels transition from one color, such as black, to another color, such as white) in each input line. The distances of the transitions from a reference position in each input line of the input image are magnified to enhance the horizontal resolution of the input image. A line is interpolated between the consecutive input lines in the input image to enhance the vertical resolution of the input image. The transitions of the interpolated line are determined according to a positional difference between the transitions of consecutive input lines in the image data. As a result, the resolution of the image data is increased in both the horizontal direction and the vertical direction. The image data is manipulated in the compressed domain, so there is no need to decompress the data. As a result, the illustrative embodiment requires less memory and operates more quickly than conventional approaches.

Figure 3:
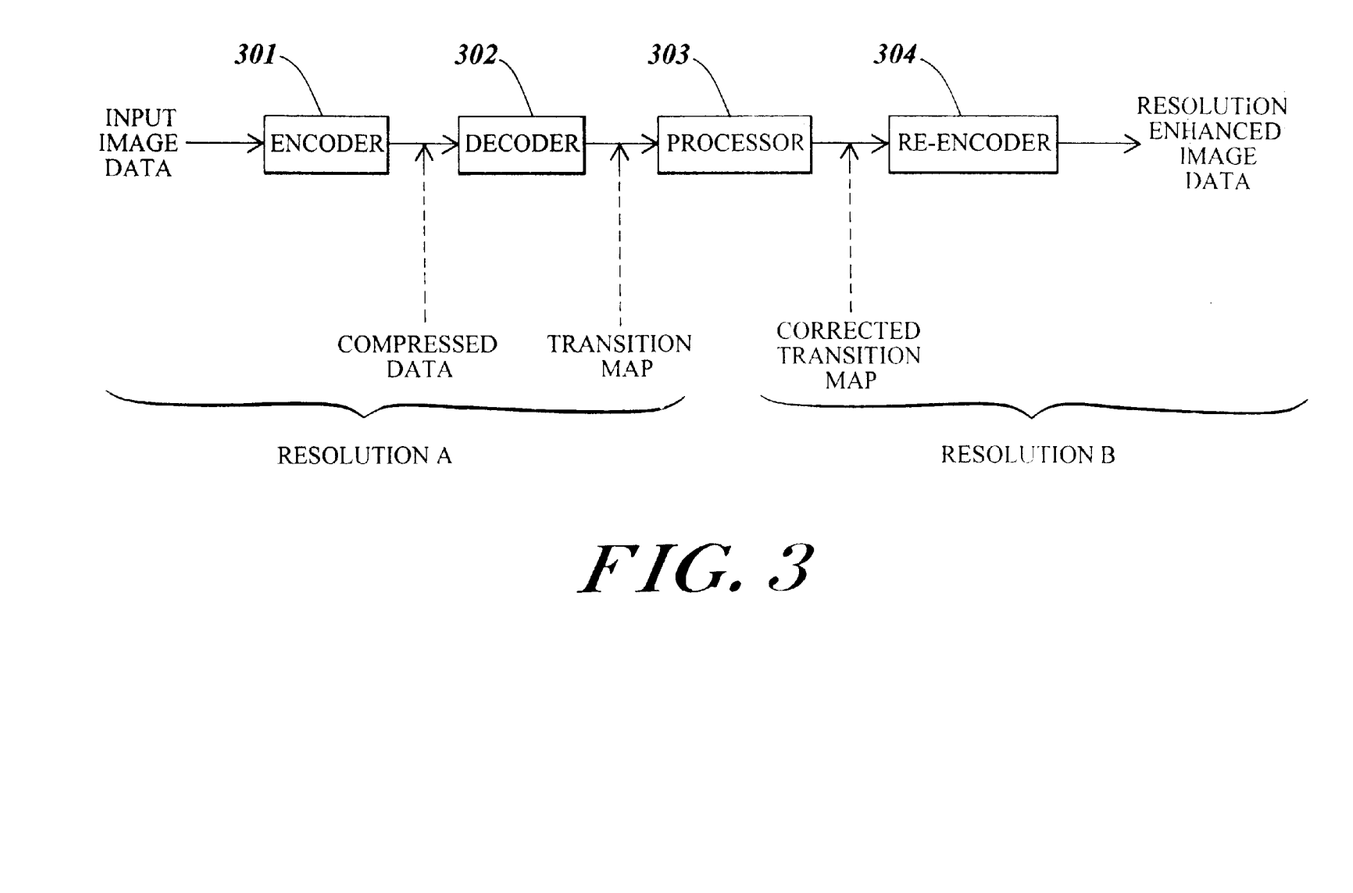
FIG. 3 is a block diagram of an illustrative embodiment of present invention that illustrates a device for enhancing resolution of input image data.

FIG. 3 is a block diagram of an apparatus for enhancing resolution of image data in accordance with the illustrative embodiment of the present invention. The apparatus operates solely on image data in the compressed domain to enhance the resolution of the image data. The illustrative embodiment will be described below relative to image data from the CCITT (International Telephone and Telegraph Consultative Committee) compressed domain. Nevertheless, those skilled in the art will appreciate that the present invention can be practiced with image data that has been compressed using other compression techniques.

When raw decompressed input image data is received, an encoder 301 compresses the input image data to produce CCITT compressed data. The CCITT has defined standard data compression techniques for transmitting faxes and a compression standard for data communications through modems. CCITT has defined many important standards for data communications, including Group 3, Group 4, V.90 (a standard for full-duplex modems sending and receiving data across phone lines at up to 56,600 BPS), X.25 (the most popular packet-switching protocol for LANs) and X.400 (a universal protocol for e-mail) etc. In particular, the Group 3 standard is a universal protocol for sending fax documents across telephone lines and specifies CCITT T.4 data compression and a maximum transmission rate of 9,600 baud. See CCITT Recommendation T.4, "Standardization of Group 3 Facsimile Apparatus for Document Transmission", Fascicle VII.3, Geneva, 1980, amended at Malaga-Torremolinos, 1984. In addition, the Group 4 standard is a protocol for sending fax documents over ISDN networks, specifies CCITT T.6 data compression and supports images of up to 400 dpi resolution. See CCITT Recommendation T.6, "Facsimile Coding Schemes and Coding Control Functions for Group 4 Facsimile Apparatus", Fascicle VII.3, Rec. T.6, Malaga-Torremolinos, 1984.

The encoder 301 generates compressed data of consecutive lines of input image data. The transitions from black to white and vice-versa are recorded and compressed on a scan-line by scan-line fashion. The compression schemes encode the input image on a horizontal scan line by scan line basis, corresponding to the way in which document are scanned and printed on an application machine. In the Group 3 standard approach (CCITT T.4 compression), each scan line is encoded independently, whereas in the Group 4 standard approach (CCITT T.6 compression), each scan line is encoded with reference to the previous line. In any case, the transitions are recorded on a scanline basis. One can obtain the transitions from black to white and vice-versa contained in the document by decoding simple variable length codes for the transitions.

Figure 4A:
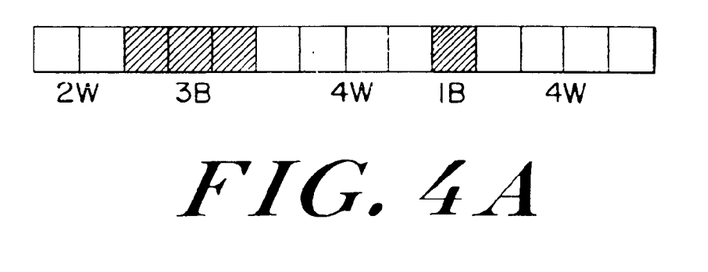
FIGS. 4A and 4B are examples of bit map of image data which illustrate the compression and transition analysis method.

With Group 3 techniques, a scan line is encoded as a set of runs, each run representing a number of white or black pixels, with white runs alternating with black runs. FIG. 4A is an example of a scan line. Every run is encoded using a variable number of bits, which can be uniquely identified upon decoding. This means that frequently occurring lengths of run may be encoded very efficiently, at the expense of the infrequent ones. If a black run of 3 pixels occurs frequently, it can be encoded using just 1 bit or 2 bits, whereas if one black pixel occurs infrequently, it may be encoded using more than 1 bit.

Figure 4B:
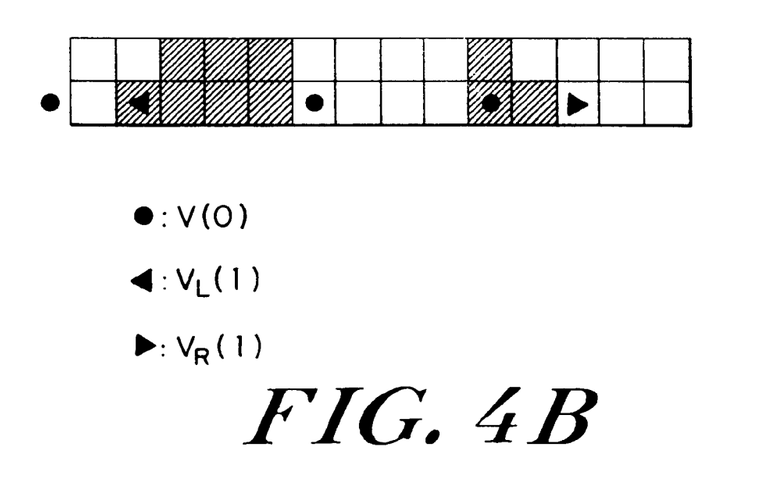

With Group 4 techniques, every scan line is compared with the previous one. FIG. 4B depicts an example of some scan lines to which Group 4 compression techniques may be applied. Rather than considering the alternating white and black runs in each scan line (as in Group 3 compression), Group 4 compression considers the positions of the changing pixels (in other words, the position of the first pixel in each run). Group 4 techniques use the position of changing pixel relative to that of the one on previous line as a coding scheme. As shown in FIG. 4B, V(0), the case where the position of transition is identical to the position of the relevant transition in the previous line, can be effectively encoded using a single bit. If $V_L(1)$ and $V_R(1)$, the cases where the transitions are shifted respectively to the left and to the right by 1 pixel from the relevant transition of the previous line, may be respectively encoded using 3 bits, the resulting code may be 9 bits in length which is substantially shorter in length than the number of pixels.

The image data compressed in the encoder 301 using above mentioned compression schemes is input to a variable length decoder 302, which maps the encoded data to specify the transitions (black to white and white to black) in each scan line of the image data. Every transition is decoded using a variable length of bits, which can be uniquely identified upon encoding. As described above in encoder 301, this also means that frequently occurring position of transitions may be decoded very efficiently, using codes with fewer bits than infrequently occurring positions of transitions. Referring to FIG. 4A, the first position of transition from white to black is 2 (i.e. after the second pixel in the row) and the second position of transition from black to white is 5 (i.e. after the fifth pixel in the row). These positions of transition from white to black or vice-versa can be obtained from the image data using a variable length decoder 302. Referring to FIG. 4B, the position of transitions in the second line of input image data shown in FIG. 4B, which is compressed using Group 4 compression scheme, is based on the transition of the previous line. The transition of the second line can be obtained by shifting the first position of transition in the first line to the left by 1 and shifting the first position of transition in the first line to the left by 1.

The transition map is basically a list of the positions of transitions in a scan line. The positions of transitions can be represented by distances of transitions from a reference position in each input line. For example, a transition map of the first line may be [2, 5, 9, 10] indicating that transitions occur after the second, fifth, ninth and tenth pixels in the line. A transition map of the second line is [1, 5, 9, 11]. In this example, the positions of the transitions in the transition map is based on the distances of the transitions from the beginning position in each input line. It is apparent to those skilled in the art that the reference position can be another position such as an ending position of each input line.

The transition map is passed to a processor 303 so that the transition map may be manipulated to form a processed transition map for an image with higher resolution. The processor 303 magnifies the transition map and interpolates a line between the input lines. The processor 303 magnifies elements of the transition maps (the positions of transitions) in each input line to increase the horizontal resolution of the image data. The processor 303 interpolates a line between the input lines to increase the vertical resolution of the image data. The transitions in the transition map of the interpolated line is determined according to positional differences between transitions in transition maps of input lines.

Figure 5A:
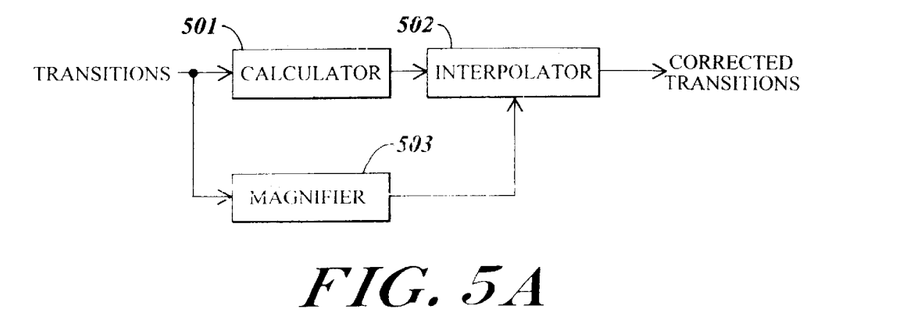
FIGS. 5A and 5B are block diagrams which illustrate detail structures of the processor shown in FIG. 3.

One embodiment of the processor 303 in accordance with the illustrative embodiment present invention is shown in FIG. 5A. This embodiment includes a calculator 501 for calculating positional differences between transitions of input lines, a magnifier 502 for magnifying the positions of transitions in each input line, and an interpolator 503 for interpolating a line between input lines. The decoded transition map of an input line is applied to the calculator 501 and the magnifier 502. The calculator 501 calculates positional differences between the closest compatible transitions in the transition maps of the input lines. The magnifier 502 outputs the magnified positions of transitions in each input line to the interpolator 503. The magnified transition map includes transitions the distance of which from a reference position are magnified. The magnifier 502 produces a new transition map that has the transitions appropriate locations for a higher resolution line. Hence, if the resolution of the line is to double, the transitions are twice as far apart in the line. The interpolator 503 interpolates a line between a number of consecutive input lines and determines the transition map of the interpolated line. The transitions of the interpolated line are determined according to the positional differences between the closest compatible transitions in the transition maps of the input lines. The transition map of the interpolated line is shifted from transition map of the magnified transition map of first input line by the positional differences.

Figure 5B:
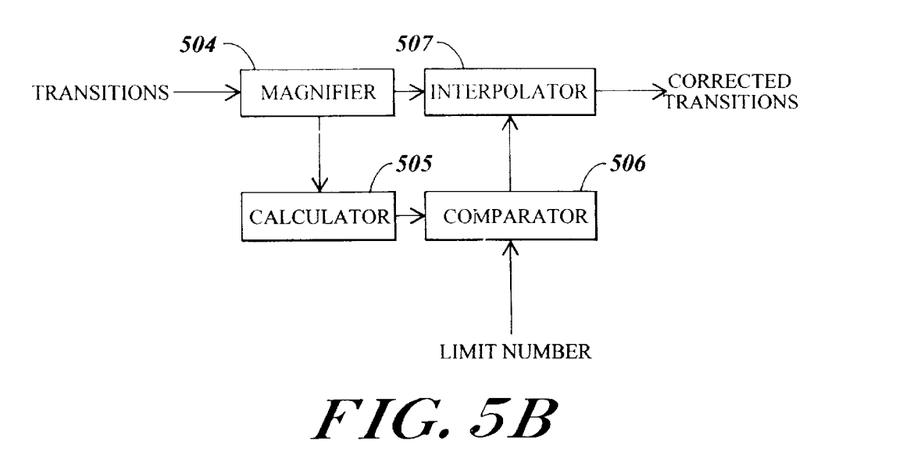

Another embodiment of the processor 303 in accordance with the present invention is shown in FIG. 5B. This embodiment includes a magnifier 504 for magnifying distances of the transition from a reference position in each transition map of the input lines, a calculator 505 for calculating positional differences of magnified transitions of input lines, a comparator 506 for comparing the positional differences with a limit number, and an interpolator 507 for interpolating a line between the input lines. The calculator calculates positional differences between closest compatible transitions in the magnified transition maps of the input lines. The positional difference is compared with a limit number which is set to 4 in this embodiment. This limit number can be changed to another number depending on the requiring level of resolution enhancement and other factors such as operating speed and product cost. The interpolator 507 interpolates a line between consecutive input lines and determines the transition map of the interpolated line. The transition map of the interpolated line is determined according to the positional differences and the limit number. The transition map of the interpolated line is the same as the magnified transition map of the next line if the positional difference is greater than 4. Otherwise, the transitions of the interpolated line are shifted from magnified transition map of the next line by a half of the positional differences.

In this embodiment, the transitions of the interpolated line are based on the transitions of the current line and the previous line of input image data. Those skilled in the art will appreciate that the transitions of the interpolated line can be determined according to the transitions of the current line and more than one previous lines of input image data. In this case, the transitions of the interpolated line can be determined by using a curve connecting each compatible transition in the current line and more than one previous lines of input image data. In this embodiment, a line is interpolated between a current line and the previous line to enhance the vertical resolution of the input image data by a factor of 2. Those skilled in the art will also appreciate that more than one lines (first interpolated line and second interpolated line, etc) can be interpolated between a current line and the previous line to enhance the vertical resolution of the input image data by a factor of more than 2. As a result, the present invention can be applicable to enhancing a resolution of input image data by up-scaling as 2×2, 3×3 and 2×1, etc.

Re-encoder 304 changes the magnified (corrected) transition map at a higher resolution into a compressed data form using variable length codes.

Figure 6:
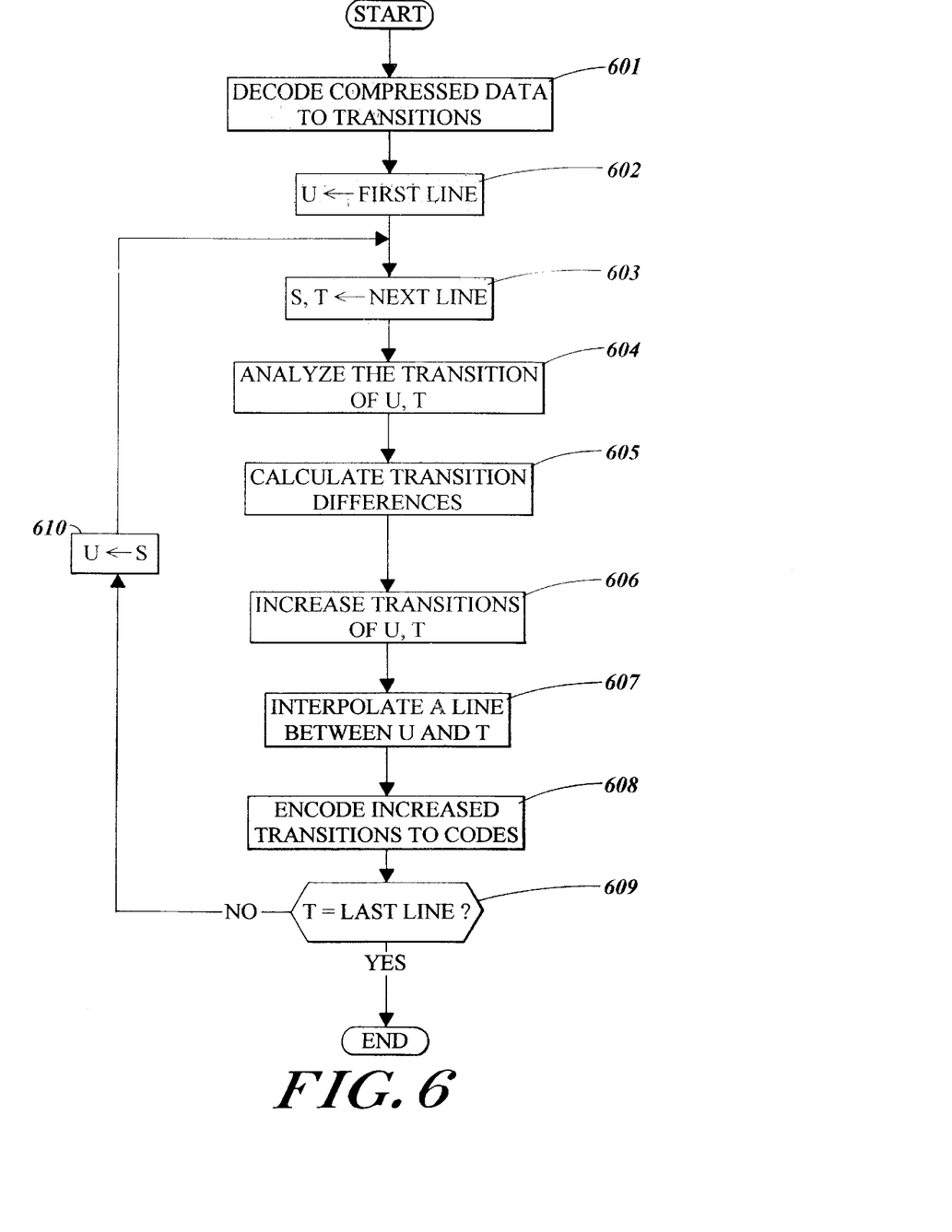
FIG. 6 is a flow chart of an illustrative embodiment of present invention that illustrates a method for enhancing resolution of input image data.

FIG. 6 is a flow chart that depicts the steps that are performing the illustrative embodiment to enhance the resolution of input image data. The input image data is compressed to CCITT compressed data and the compressed data is decoded to transitions (step 601). The transitions of a first scan line in the compressed image data are input and stored in vector U (step 602). The transitions of the next scan line in compressed image data are input and stored in vector T (step 603). The transitions of the compressed image data stored in vector T are also reserved in vector S for the next loop operation of this embodiment (step 603). Therefore the two consecutive scan lines of compressed image data are sequentially input and stored respectively in vectors U and T. The first scan line of input image data is used for context in this embodiment.

The next step is to analyze the transitions of the input lines of the compressed image data and to make a transition map of each input line (step 604). Each transition map is a list of the transition offsets in each scan line. The illustrative embodiment applies the resolution enhancement to the transition map and not to the image pixels. The reference transition position can be the last transition in the same line or the transition in the previous line, depending on the CCITT compression scheme that is used to compress the image data.

After analyzing the transitions of each input line of the image data (step 604), the positional differences between the closest compatible transitions in the transition maps of the two input lines are calculated (step 605). The positional differences are used to determine the transitions in the interpolated line between the input lines.

The analyzed transitions in each transition map of the input lines are corrected to form a processed transition map corresponding to an image with larger resolution. In this embodiment, the transitions of each transition map are magnified (step 606) to enhance the resolution of input image data by a factor of 2. Those skilled in the art will appreciate that more than one lines (first interpolated line and second interpolated line, etc) can be interpolated between a current line and the previous line to enhance the vertical resolution of the input image data by a factor of more than 2.

In order to enhance the resolution of input image data, a line is interpolated between the input lines. The transitions in a transition map of the interpolated line are determined according to the positional differences calculated (step 605).

More specifically, the transitions in the transition map of the interpolated line are determined by shifting the magnified transitions in the transition map of the first line by the positional differences.

As described above, the transitions of the interpolated line are based on the transitions of the current line and the previous line of input image data. Those skilled in the art will appreciate that the transitions of the interpolated line can be determined according to the transitions of the current line and more than one previous lines of input image data. In this case, the transitions of the interpolated line can be determined by using a curve connecting each compatible transition in the current line and more than one previous lines of input image data.

The last step is to encode the magnified transitions of the input lines and the transitions of the interpolated line to compressed codes (step 608). In order to repeat the above operation on the every line of input image data, a check is made whether the input line vector T corresponds to the last line of the image data. If the operation is not conducted on the every line of the input image data, the compressed image data stored in vector S is transferred to vector U (step 610), and the process goes to step 603 to repeat the above described operations.

For aiding in the understanding of the operation of the described embodiments, an example is given as below. As a new line of compressed image data is received, the transitions in the data are analyzed, and an intermediary-line is interpolated between the past line and the new line. If the transitions in the new line are shifted by S pixels to left or right in relation to the past scan-line, the transitions in the interpolated line are conditionally set to be shifted by S pixels from original transition magnified for the new resolution. The transition position of the interpolated line is encoded and the new line transitions are magnified and encoded.

Figure 7:
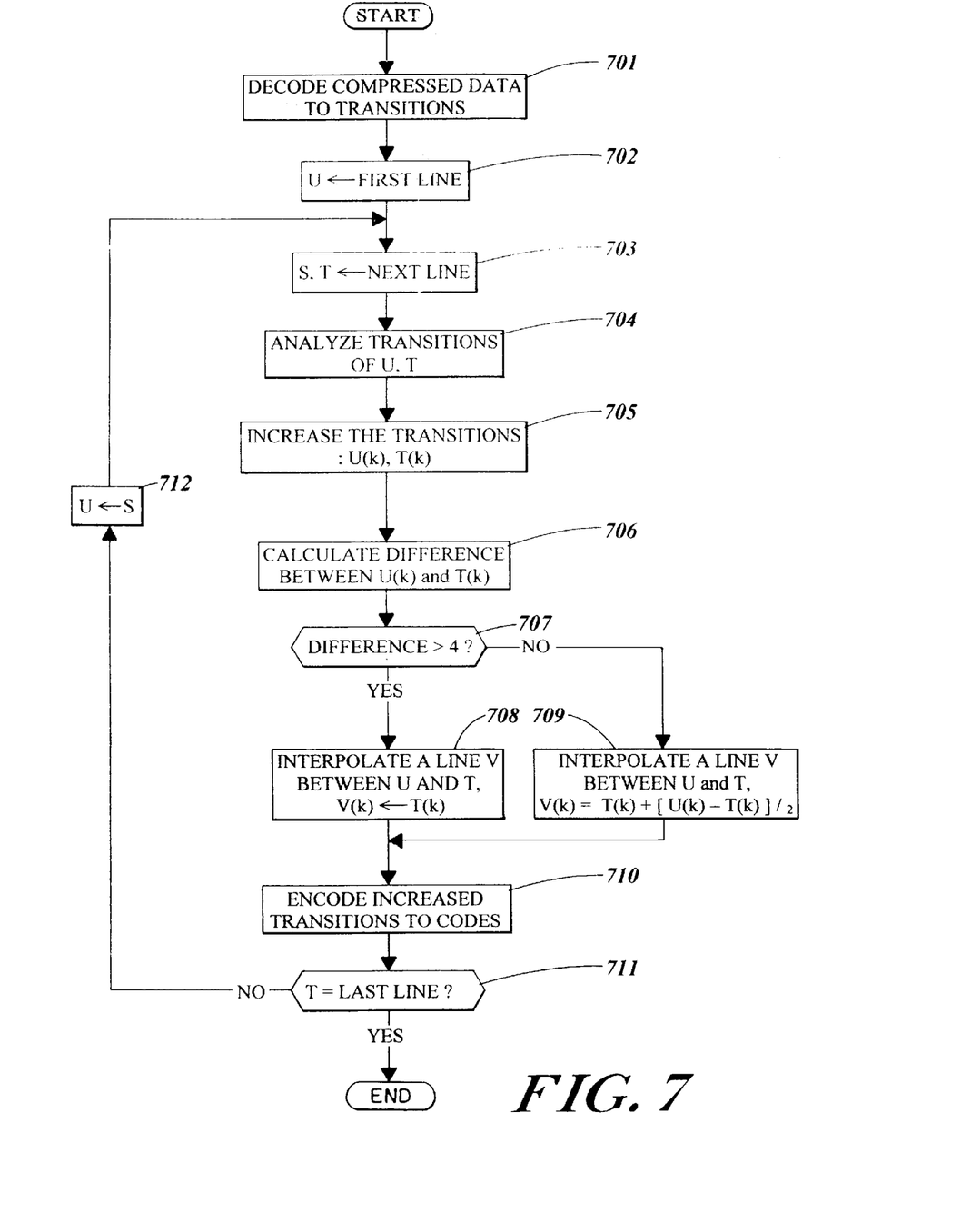
FIG. 7 is a flow chart of another embodiment of present invention that illustrates a method for enhancing resolution of input image data.

FIG. 7 is a flow chart of another embodiment of present invention for enhancing resolution of input image data.

The steps 701–704 are the same as the steps 601–604 in FIG. 6. One of the differences between this embodiment and the previous embodiment in FIG. 6 is that the operation order of transition magnifying step (step 705) and positional difference calculating step (step 706) is changed in reverse. Another difference is that transitions of an interpolated line are shifted from the transition of the next line by limited positional differences between the transitions of the first line and the next line. The next line is used for context in this embodiment.

After analyzing the transitions in a transition map of the input lines (step 704), the analyzed transitions in each transition map of the input lines are corrected to form a processed transition map corresponding to an image with larger resolution. In this embodiment, the transitions of each transition map are magnified (step 705) to enhance the resolution of input image data by a factor of 2. Those skilled in the art will also appreciate that two lines (first interpolated line and second interpolated line) can be interpolated between a current line and the previous line to enhance the vertical resolution of the input image data by a factor of 3.

The positional differences between the closest compatible transitions in the magnified transition maps of input lines are calculated (step 706). The positional differences are used to determine the transitions in the interpolated line between the input lines.

After calculating the positional difference of transitions, the positional differences are compared with a predetermined limit number (step 707). In this embodiment, the predetermined limit number is set to 4. This limit number can be changed to another number depending on the requiring level of resolution enhancement and other factors such as operating speed and product cost.

Steps 708 and 709 interpolate third line between the first line and the next line. Transitions of the interpolated line are determined according to the positional differences calculated at the step 706 and the limit number at the step 707.

If the positional difference is greater than 4, the transitions of the interpolated line is same as the transition in the magnified transition map of the next line. If otherwise, the transitions of the interpolated line are determined by shifting the transitions in the magnified transition map of the next line by a half of the positional differences.

The remaining steps 710–712 are the same as steps 608–610 in FIG. 6, which were described above.

For aiding in the understanding of the operation of the described embodiment, an example is given as below. As a new line of compressed image data is received, the transitions are analyzed and an intermediary line is interpolated between the past line the new line. If the transitions in the new line are shifted by S pixels to left or right in relation to the past scan-line, the transitions in the interpolated line are conditionally set to be shifted by 2S/2 pixels from the transitions in the magnified transition map of the next line for the new resolution. If S is greater than 4/2=2, the transitions in the interpolated line are set to be the same as the transitions in the magnified transition map of the next line for the new resolution. The transition position of the interpolated line are encoded and the new line transition are encoded and the new line transitions are magnified and encoded.

Figure 8A:
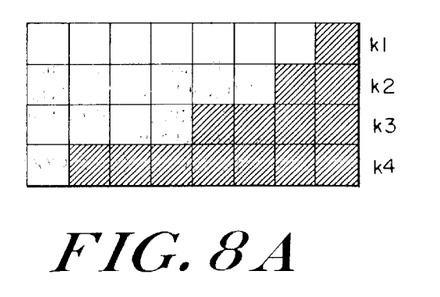
FIGS. 8A and 8B are bitmap examples of an input image and a resolution enhanced image output according to the method depicted in FIG. 7.
Figure 8B:
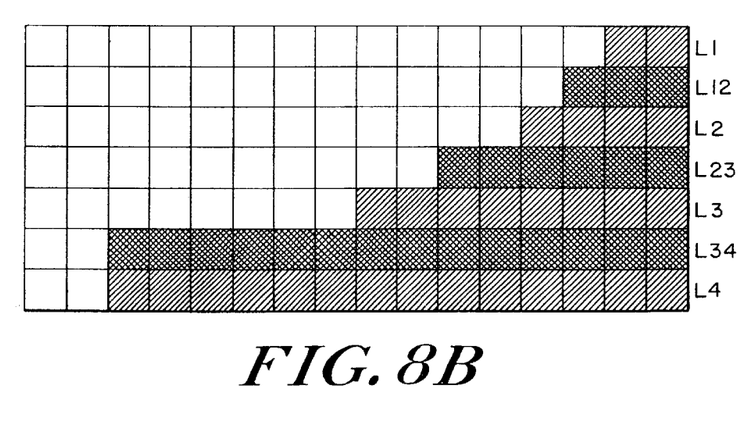

FIG. 8A and 8B are bitmap examples of an original image and a resolution enhanced image output according to the method depicted in FIG. 7. Each line of the original image is designated as k1–k4 in FIG. 8A. FIG. 8B is an output of the input image of FIG. 8A and each line of the resolution enhanced image is designated as L1–L4 and L12–L34 where the lines L1–L4 are corresponding to the line k1–k4 and doubled for higher resolution. The lines L12–L34 are interpolated lines according to the method depicted in FIG. 7 to enhancing the resolution.

The transition of the line L12 is set to be shifted by 2/2=1 pixel from the transition of the line L2. The transition of the line L23 is set to be shifted by 4/2=2 pixels from the transition of the line L3. The transition of the line L34 is set to be the same as the transition of line L4.

Figure 9A:
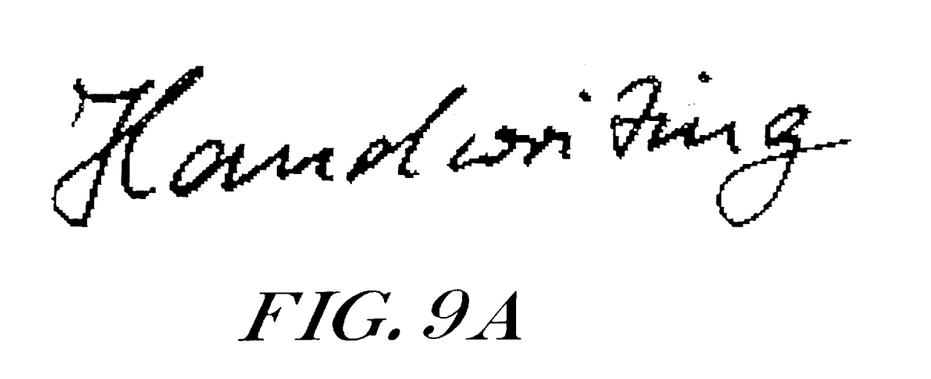
FIG. 9A is an example of an image that is simply magnified in both the horizontal direction and the vertical direction.
Figure 9B:
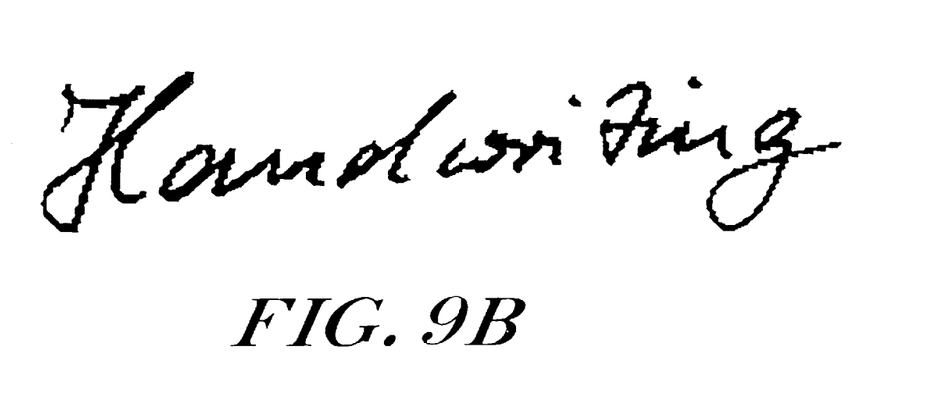
FIG. 9B is an example of an output in the present invention that illustrates the effect of the present invention.

FIG. 9A is an example of an image that is simply magnified by a factor. FIG. 9A shows that the original input image is simply replicated in both the horizontal direction and the vertical direction. FIG. 9B is an example of an output in the present invention that illustrates the effect of the present invention. FIG. 9B shows that the present invention makes a very good performance in terms of very high frequency jaggedness.

It is, therefore, apparent that there has been provided, in accordance with the present invention, a method and apparatus for resolution enhancement of input images in a compressed domain. While this invention has been described in conjunction with illustrative embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for increasing resolution of image data, said method comprising the steps of:
   (a) receiving compressed image data having resolution information; and
   (b) manipulating the resolution information of the compressed image data to increase the resolution of the image data without decompressing and recompressing the image data, including:
   interpolating a line between input lines in the compressed image data to increase a vertical resolution of the image data, wherein transitions of the interpolated line are determined according to positional differences between closest compatible transitions in the input lines of the compressed image data.

2. The method of claim 1 wherein the resolution information is transitions of each input line in the compressed image data.

3. The method of claim 2 wherein positions of the transitions in each input line of the compressed image data are magnified to increase a horizontal resolution of the image data.

4. The method of claim 1, wherein the input lines of the compressed image data are consecutive.

5. The method of claim 1 wherein said step (b) includes a step of encoding the manipulated resolution information to compressed codes.

6. In an electronic device, a method for enhancing resolution of compressed image data, said method comprising the steps of:
   (a) analyzing transitions in a first transition map of a first input line of the compressed image data and a second transition map of a second input line of the compressed image data;
   (b) calculating a positional difference between closest compatible transitions in the first transition map and the second transition map;
   (c) magnifying a distance between a reference position and each transition in the first transition map and the second transition map;
   (d) interpolating a third line between the first line and the second line, transitions in a third transition map of the third line being determined according to the positional differences calculated at said step (b); and
   (e) encoding the magnified transitions in the second transition map and the interpolated transitions in the third transition map to compressed codes.

7. The method of claim 6 wherein the compressing at said step (a) is performed in accordance with CCITT compressing recommendations.

8. The method of claim 6 wherein the first input line and the second input line are consecutive scan lines in the compressed image data.

9. The method of claim 6 wherein the reference position in said step (c) is a beginning position of each input line.

10. The method of claim 6 wherein the reference position in said step (c) is an ending position of each input line.

11. The method of claim 6 wherein the transitions of the third line at said step (d) are determined by shifting the magnified transitions in the first transition map by the positional difference of the transitions calculated at said step (b).

12. In a computer system, a method for enhancing resolution of compressed image data, said method comprising the steps of:
   (a) analyzing transitions in a first transition map of a first line of the compressed image data and a second transition map of a second line of the compressed image data;
   (b) magnifying a distance between a reference position and each transition in the first transition map and the second transition map;
   (c) calculating a positional difference between closest compatible transitions in the first and second transition maps magnified in said step (b);
   (d) comparing the positional differences with a predetermined limit number;
   (e) interpolating a third line between said first line and said second line, transitions of the third line being determined according to the positional difference of transitions calculated at said step (c) and the limit number at said step (d); and
   (f) encoding the magnified transitions in the second transition map and the interpolated transitions in the third transition map to compressed codes.

13. The method of claim 12 wherein the compressing at said step (a) is performed in accordance with CCITT compressing recommendations.

14. The method of claim 12 wherein the first input line and the second input line are consecutive scan lines in the compressed image data.

15. The method of claim 12 wherein the limit number is 4.

16. The method of claim 12 wherein the reference position in said step (b) is a beginning position of each input line.

17. The method of claim 12 wherein the reference position in said step (b) is an ending position of each input line.

18. The method of claim 12 wherein the transitions of the third line are transitions in the magnified second transition map if the positional difference is greater than the limit number at said step (e).

19. The method of claim 18 wherein the transitions of the third line are otherwise determined by shifting magnified transitions in the second transition map by a half of the positional differences.

20. An apparatus for enhancing a resolution of compressed image data, said apparatus comprising:
   a decoder for respectively mapping the compressed image data to a first transition map of the first line and a second transition map of the second input line;
   a processor for magnifying the first transition map and the second transition map and for interpolating a third line between the first input line and the second input line, the transitions of the third line being determined according to the first transition map and the second transition map; and
   an encoder for encoding the transition map of each line into compressed codes.

21. The apparatus of claim 20 wherein said encoder compresses the image data in accordance with CCITT recommendations.

22. The apparatus of claim 20 wherein said processor includes:
   a means for calculating a positional difference between the closest compatible transitions in input lines;
   a means for magnifying a distance between a reference position and each transition of the first line and the second line;
   a means for interpolating a line between the input line, transitions of the interpolated line being determined according to the positional differences.

23. The apparatus of claim 20 wherein the transitions of the interpolated line are shifted from transitions of the magnified first transition map by the positional differences.

24. The apparatus of claim 20 wherein said processor includes:
- a means for magnifying a distance between a reference position and each transition of the first line and the second line;
- a means for calculating a positional difference between closest compatible transitions in the magnified transition map of first line and the second line;
- a means for comparing the positional differences with a predetermined limit number;
- a means for interpolating a third line between said first line and said second line, transitions of the third line being determined according to the positional differences and the limit number.

25. The apparatus of claim 20 wherein the limit number is 4.

26. The apparatus of claim 20 wherein the transitions of third line are magnified transitions in the transition map of said second line if said positional difference is greater than the limit number.

27. The apparatus of claim 20 wherein the transitions of third line are shifted from magnified transitions in the transition map of the first line by a half of said positional differences if said positional difference is less than or equal to the limit number.

28. A computer program product for controlling a computer to enhance a resolution of compressed image data, said program product comprising:
- a recording medium readable by the computer;
- means recorded on said recording medium for analyzing transitions in a first transition map of the first input line and a second transition map of the second input line of compressed image data;
- means recorded on said recording medium for calculating positional differences between the closest compatible transitions in the first transition map and the second transition map;
- means recorded on said recording medium for magnifying transitions in the first transition map and the second transition map;
- means recorded on said recording medium for interpolating a third line between the first line and the second line, transitions of the third line being determined according to the positional differences; and
- means recorded on said recording medium for encoding the transition maps of the second and third lines to compressed codes.

29. A facsimile machine for enhancing a resolution of compressed image data, said facsimile machine comprising:
- an analyzer for analyzing transitions in a first transition map of the first input line and a second transition map of the second input line of compressed image data;
- a calculator for calculating positional differences between the closest compatible transitions in the first transition map and the second transition map;
- a magnifier for magnifying transitions in the first transition map and the second transition map;
- an interpolator for interpolating a third line between the first line and the second line, transitions of the third line being determined according to the positional differences; and
- an encoder for encoding the transition maps of the second and third lines to compressed codes.

* * * * *